Oct. 4, 1927.  
G. E. EDMUNDS  
1,644,009  
MINE CAR  
Filed March 24, 1926    7 Sheets-Sheet 1

Inventor  
Glenn E. Edmunds.

By Cushman Bryant Darby  
Attorneys

Oct. 4, 1927.

G. E. EDMUNDS 1,644,009

MINE CAR

Filed March 24, 1926

Inventor

Glenn E. Edmunds

By Cushman Bryant Darby
Attorneys

Oct. 4, 1927.　　　　　G. E. EDMUNDS　　　　　1,644,009
MINE CAR
Filed March 24, 1926　　　　7 Sheets-Sheet 3
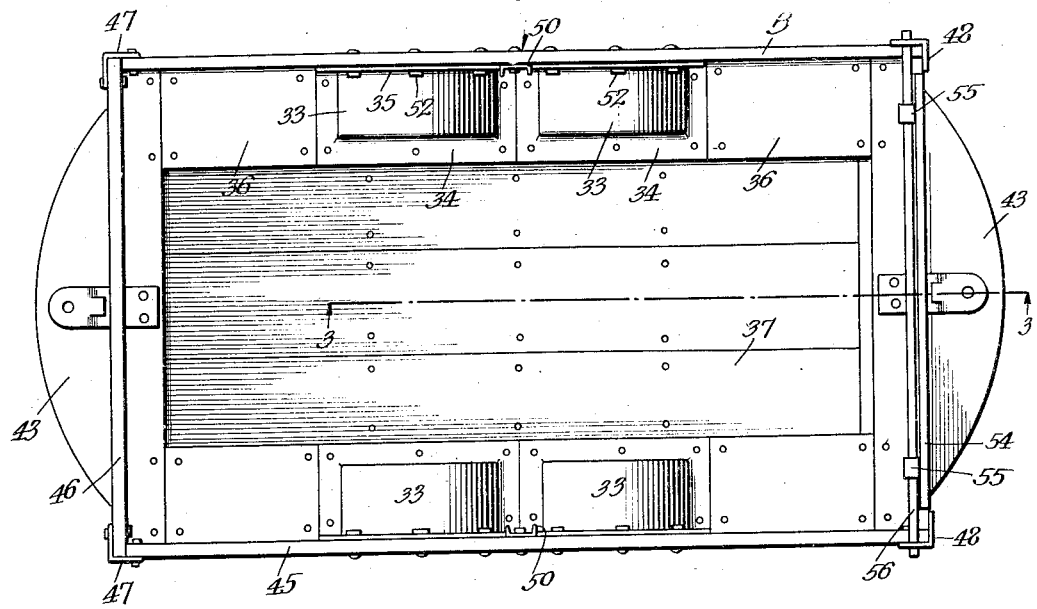
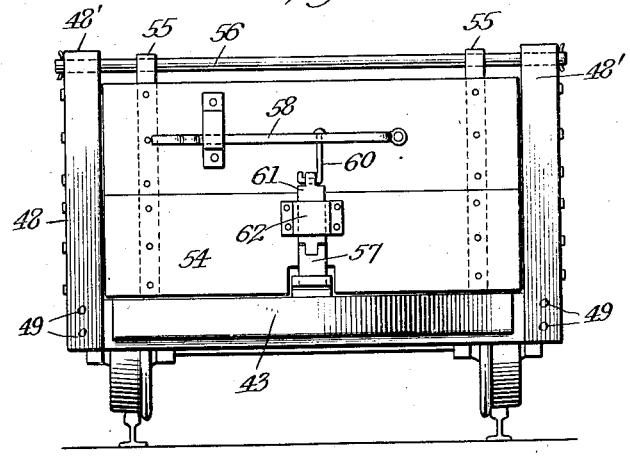
Inventor
Glenn E. Edmunds,
By Cushman Dyrant Darby
Attorneys Oct. 4, 1927.                               1,644,009
G. E. EDMUNDS
MINE CAR
Filed March 24, 1926           7 Sheets-Sheet 4
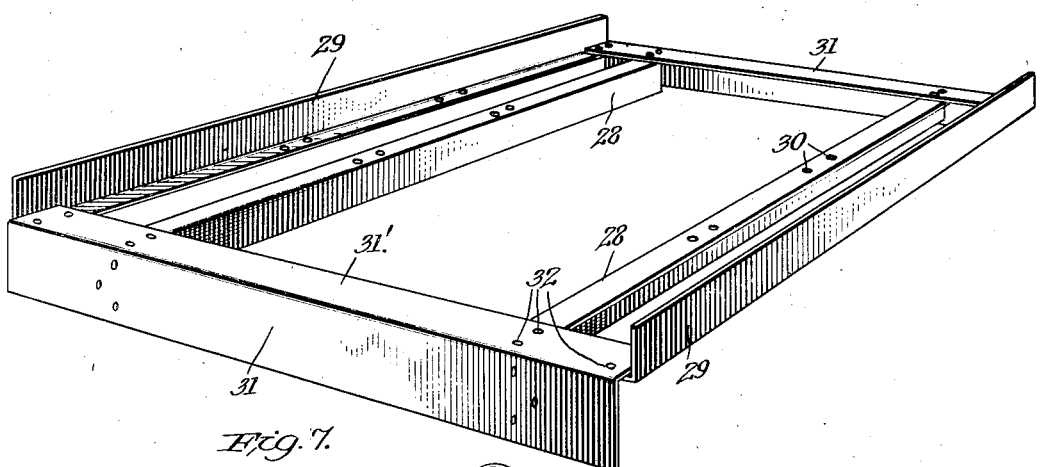
Fig. 7.
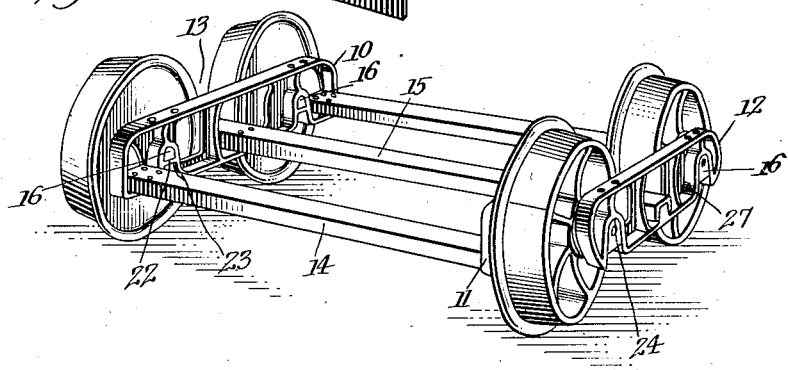
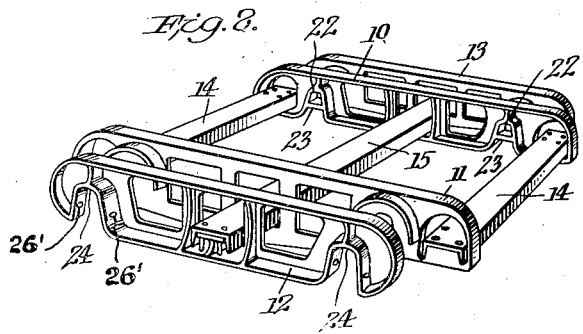
Fig. 8.
Inventor
Glenn E. Edmunds,
By Cushman Bryant Darby
Attorneys Oct. 4, 1927.

G. E. EDMUNDS 1,644,009

MINE CAR

Filed March 24, 1926

Inventor

Glenn E. Edmunds

Oct. 4, 1927.  G. E. EDMUNDS  1,644,009
MINE CAR
Filed March 24, 1926   7 Sheets-Sheet 6
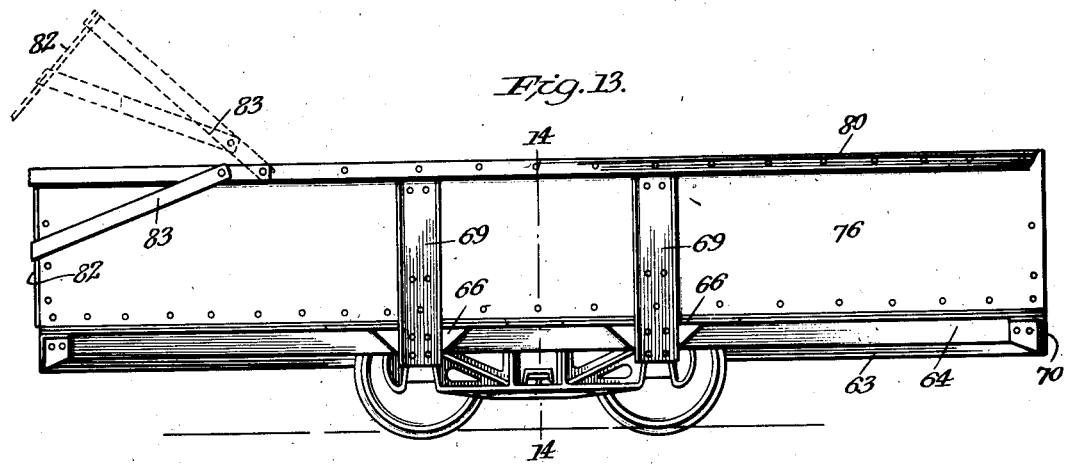
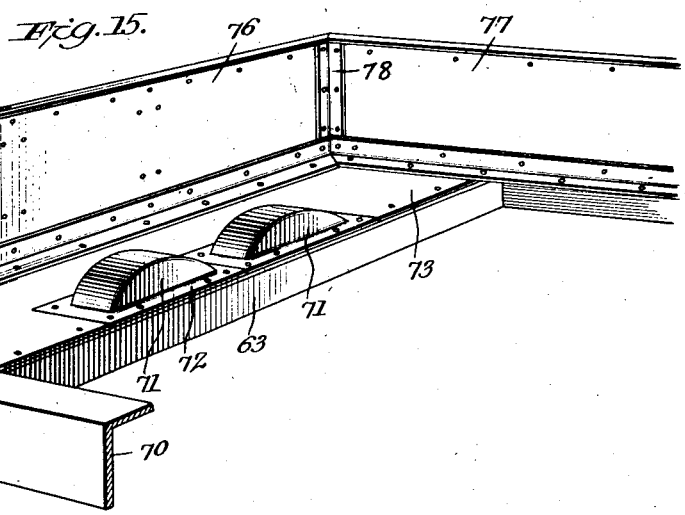
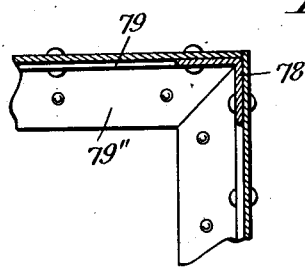
Inventor
Glenn E. Edmunds Oct. 4, 1927.
G. E. EDMUNDS
1,644,009
MINE CAR
Filed March 24, 1926
7 Sheets-Sheet 7
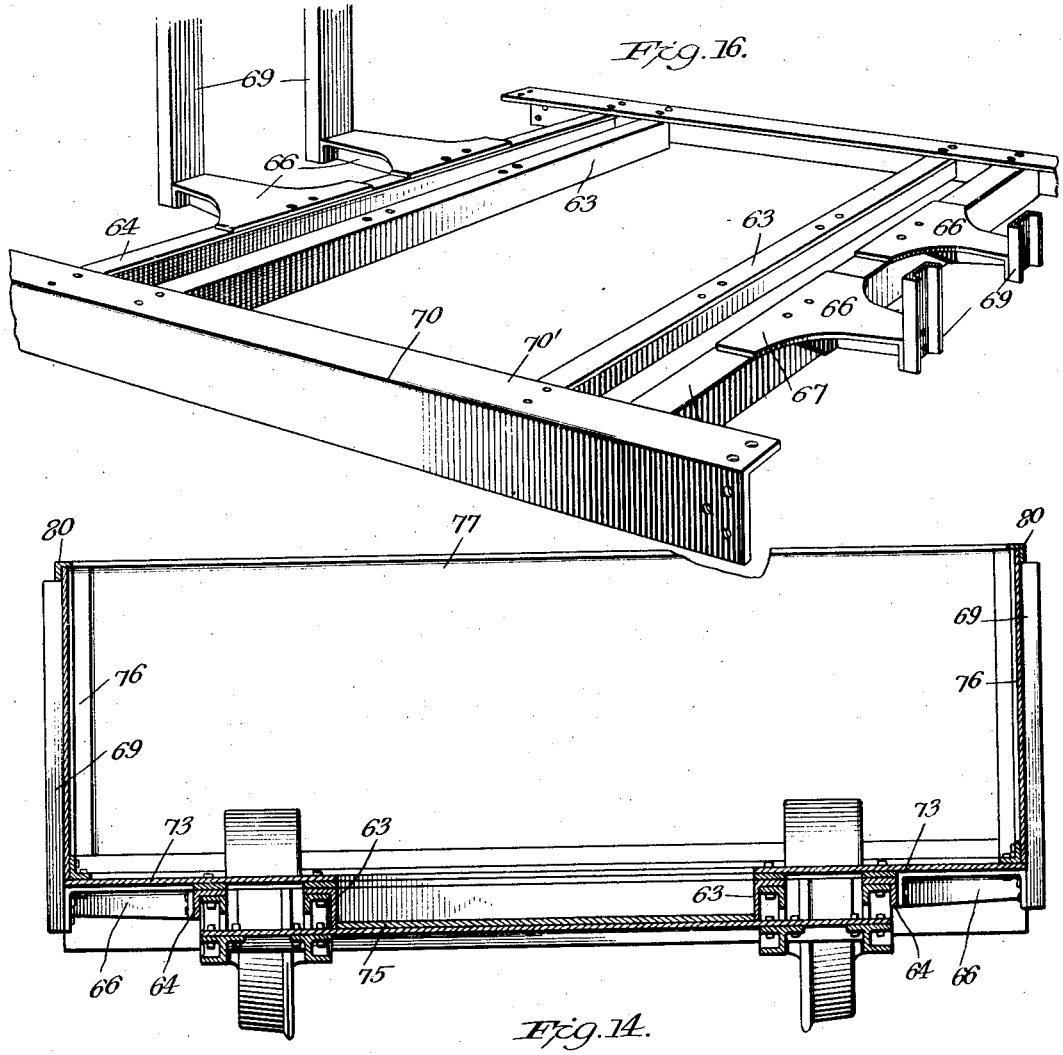
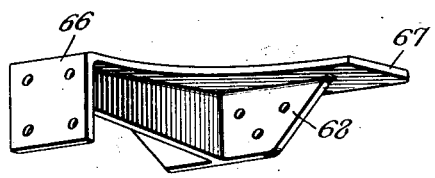
Inventor
Glenn E. Edmunds,
By Cushman, Bryant Darby
Attorneys Patented Oct. 4, 1927.

1,644,009

UNITED STATES PATENT OFFICE.

GLENN E. EDMUNDS, OF COLUMBUS, OHIO, ASSIGNOR TO THE BONNEY-FLOYD COMPANY, OF COLUMBUS, OHIO, A CORPORATION OF OHIO.

MINE CAR.

Application filed March 24, 1926. Serial No. 97,068.

This invention relates to cars, and more particularly to cars of the class used in coal mines and industrial plants.

The invention is an improvement upon the car disclosed in the patent to Edmunds, No. 1,525,072, granted Feb. 3, 1925, and more particularly in the construction of the body frame and the mounting of the same upon the truck.

The invention also has to do with the wheel mounting, and seeks to provide a novel mounting of the stub axle type, in which each wheel is provided with an independent axle.

In the patent mentioned there is disclosed a truck having a plurality of independently mounted wheels, the truck consisting of side sill bars connected by cross-girts.

An object of the invention is to provide a body construction which may be readily and securely mounted upon a truck of the type disclosed in said patent. It should be understood, however, that the invention in its broader aspects is not limited to a car comprising the truck disclosed in this patent, although the preferred embodiment illustrated in the accompanying drawings is shown as applied thereto.

Another object of the invention is to provide a car of simple construction which will embody all of the advantageous features of the cars of the better class now in use, and which will have the parts so constructed and arranged as to be more durable. As is well known, these cars are subjected to rough usage, and must withstand severe strains and stresses. They are coupled together in long trains, and although necessarily restricted in size, each carries in many cases, several tons of material.

The rail tracks in the mines or industrial plants cannot, with economy, be laid with precision. The grades are often excessive, and change of grade is frequently met. The curves in the tracks are of short radii, and are repeated at frequent intervals along the system.

Due to the conditions under which the cars are used, severe strains are imposed upon the wheels and axles, and upon the body frame as well. Consequently, it will be understood that it is highly desirable to provide a car of simple construction which is a rigid, durable unit, having a minimum number of rugged parts.

A futher object of the invention is to provide a car which has a maximum of cubical capacity without increase in the overall height and width of the cars now in use. As is well known, these cars, especially in coal mines, must travel in rooms or entries where the roof of the mine is comparatively low; and this condition prohibits increasing the height of the cars beyond a certain fixed limit.

In the accompanying drawings, there is shown a preferred embodiment of the invention, in which the improved wheel mounting and body frame construction is illustrated as applied to a truck of the type disclosed in the patent above mentioned.

In the drawings:

Figure 5 is a top plan view.

Figure 6 is an end view.

Figure 7 is a view of the truck with the body base frame raised therefrom.

Figure 8 is a perspective view of the truck before application of the body base frame.

Figure 13 is a side elevational view of a larger form of car having slightly modified body construction.

Figure 14 is a vertical section on the line 14—14 of Figure 13.

Figure 15 is a fragmentary interior perspective of Figure 13.

Figure 16 is a perspective of the body base frame of the modified car construction of Figures 13 and 14.

Figure 17 is a fragmentary horizontal sectional view showing the construction at the corners where the side walls are joined.

Figure 18 is a perspective of one of the laterally extending brackets of the body base frame.

Figure 2:
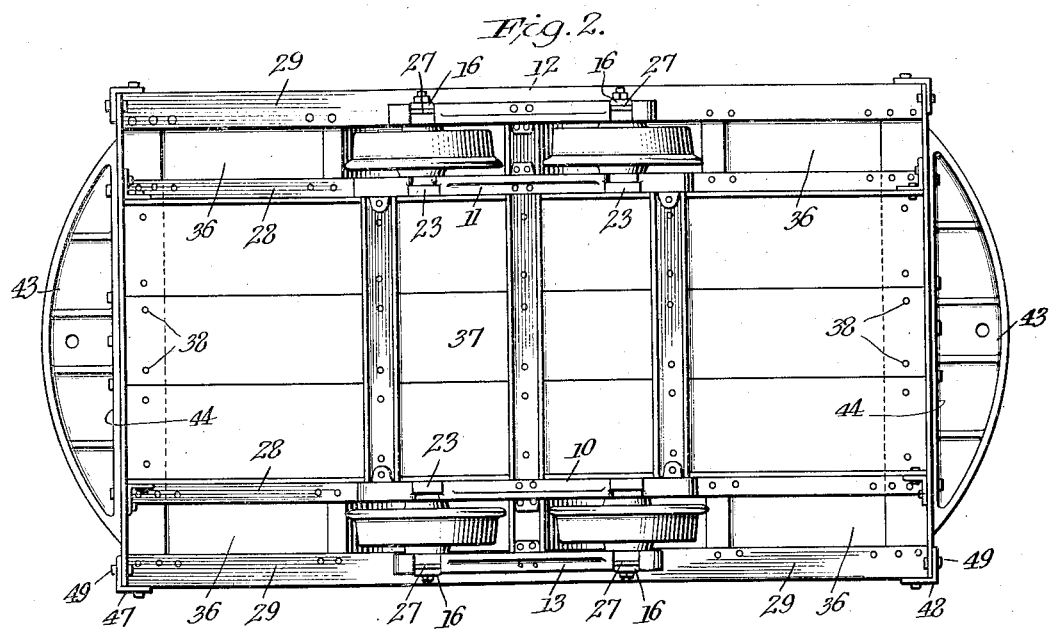
Figure 2 is a bottom plan view.

The car comprises broadly, two separable units, namely, a truck unit T having independently mounted wheels, and a body unit B which may be formed with the truck in the construction of the car, or separately formed, and then mounted upon the truck. Irrespective of the mode of construction or assembly, these two parts may be conveniently considered separately as a truck unit and a body unit, respectively, although it is to be understood that the use of the term "unit" does not restrict the invention to separately or pre-formed parts which are assembled after each has been independently constructed.

Referring first to the truck unit, which is illustrated in Figures 7, 8, the same comprises side sills or bars, arranged, preferably, in pairs, each pair having truck wheels disposed therebetween. In the drawings, 10, 11 indicate the inner members of each pair, and 12, 13, the outer members. These side sill bars are connected by channel beam cross-girts 14, the central one 15, of which, extends through the inner sill bars 10, 11, and is secured to the outer sill bars between the wheels. The latter are mounted independently upon stub axles 16 each having a central cylindrical portion upon which the roller bearings 17 may be arranged within the wheels. The axles are preferably hollow, being provided with lubricant exit apertures 18, and may be charged through suitable filling openings 19 at their outer enlarged ends 20.

The outer ends 20, and the reduced inner ends 21 are flattened or angularly formed to fit snugly within seats of substantially inverted U-shape. The seats 22 formed in the inner sill bars 10, are closed at their lower ends by means of cross-webs 23, and snugly receive the reduced axle ends 21, the latter being freely insertable into and withdrawable from the seats through the wheels, due to the fact that the ends 21 are reduced. The outer enlarged ends 20 of the axles fit snugly within seats 24, which are open at their lower ends. To prevent accidental downward movement of the axles, inward movement being prevented by the enlargement of the outer axle ends, the latter are formed with transverse grooves 26, through which extend releasable pins 27. When the pins are inserted into the outer sill casting openings 26' in, and extend through the grooves 26 across the outer axle seats, the axles are held against either downward or longitudinal movement. There is, however, no torsional strain upon the pins 27 since the axles fit snugly into their seats, and all torsional strain is taken up by the sill bars. When it is necessary to change a wheel, or axle, the cotter pin 27 is simply removed, and if the axle is drawn outwardly for a few inches to withdraw its inner end from the seat 22, the wheel and axle will drop from between the two sill bars. Moreover, it is possible to withdraw any axle without removing its wheel, since the reduced inner end of the axle may be drawn through the wheel hub and outer axle seat.

Figure 4:
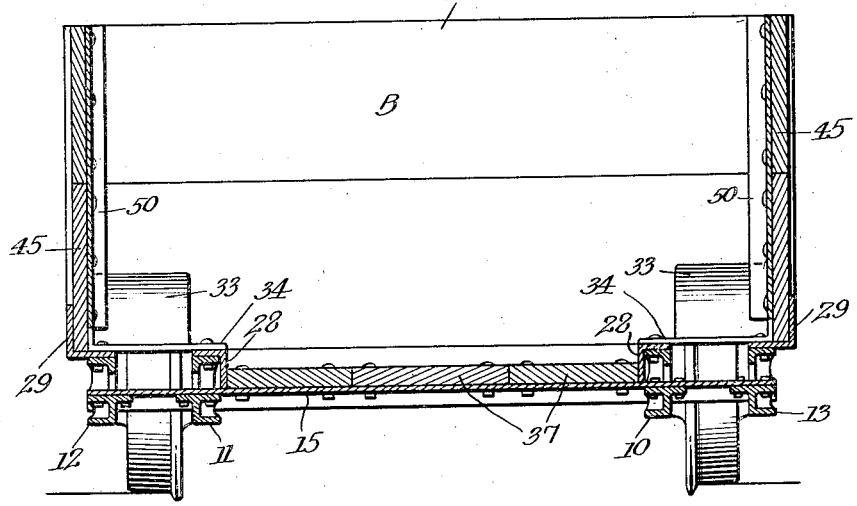
Figure 4 is a vertical sectional view on substantially the line 4—4 of Figure 1.
Figure 9:
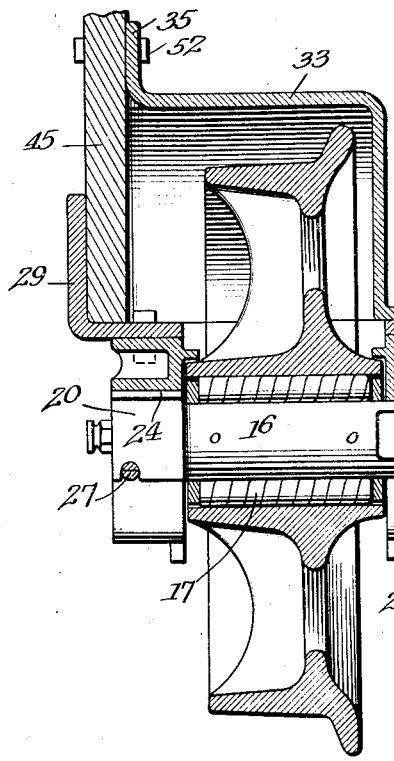
Figure 9 is a vertical sectional view taken through one of the wheels to show the wheel mounting.
Figure 10:
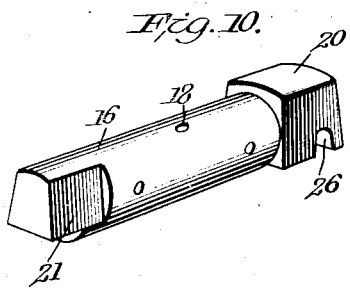
Figure 10 is a perspective of one of the axles.
Figure 11:
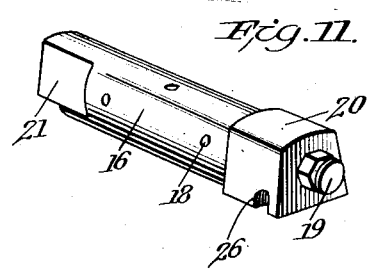
Figure 11 is a perspective showing the outer enlarged axle end.
Figure 12:
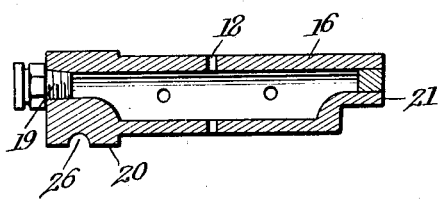
Figure 12 is a longitudinal vertical section of the axles.

Referring now to the body unit, the same comprises a base frame structure in which is mounted directly upon the truck sill bars (Figs. 4 and 7). The base frame comprises opposite side elements which extend longitudinally above the sill bars of the truck. Each side element consists of an inner bar 28 and an outer bar 29, the two bars being preferably of angular construction in cross section.

As illustrated in the drawing the bars 28, 29 may be integrally fabricated angle irons although, of course, they may be of other than integral formation so long as the angularly cross-sectional construction is obtained, and the inner bars 28 have vertical flanges extended downwardly at the inner sides of the inner truck sill bars, and horizontal flanges formed with openings 30 to receive bolts by means of which the bars may be secured to the inner sill bars of the truck. The outer bars 29 have vertical flanges directed upwardly and horizontal flanges arranged in substantially the same plane with the horizontal flanges of the inner bars, whereby all of bars may rest substantially flush upon the top surfaces of the inner and outer truck sill bars. The side elements of the base frame are connected at their ends by cross bars 31 of angle iron, the cross bars having their horizontal flanges 31' secured, as by means of bolts 32, to the horizontal flanges of the longitudinal side bars 28, 29. This base frame structure is an important feature of the invention, and when mounted upon the truck with the side bars resting flush upon the truck sill bars, the vertical flanges of the inner bars 28, as will be observed from an inspection of Figure 4, extend downwardly at the inner sides of the inner sill bars 10, 11. It will be understood, of course, that although each angularly formed bar element of the body base frame is illustrated as a fabricated unitary structure, the invention is not limited to this integral formation since obviously an angular formation might be obtained by uniting independent elements to provide a substantially integral structure.

The spaces between the side bars receive the wheels of the truck, and these may be covered by means of hoods 33, having inner flanges 34 secured to the top horizontal flanges of the bars 28, and outer vertical flanges 35 adapted to be secured to the body side walls, the construction of which will later be described. The remainder of the space between the bars 28, 29 may be closed by means of cover plates 36.

Figure 3:
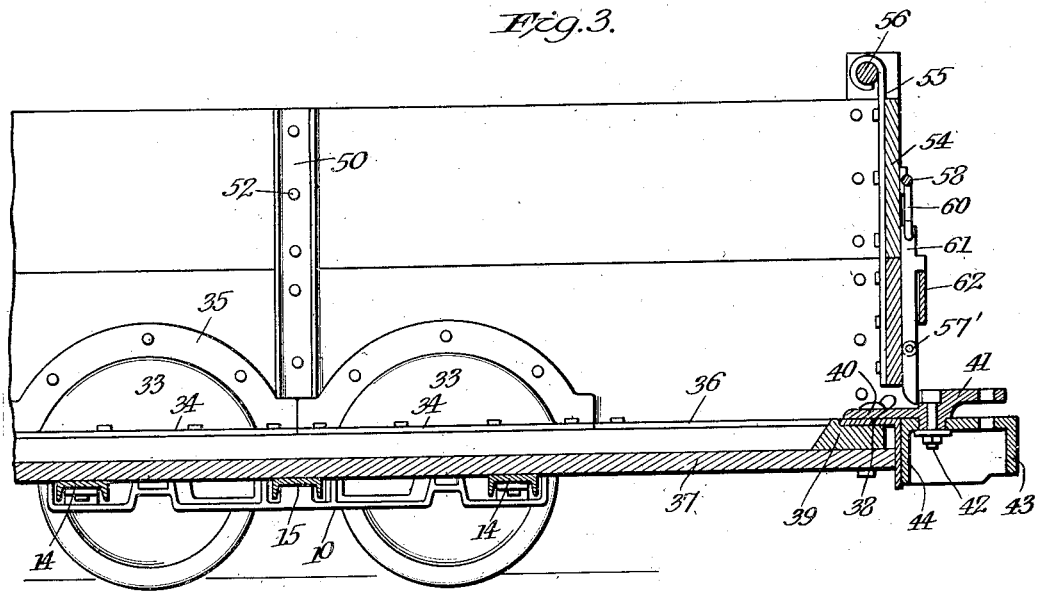
Figure 3 is a fragmentary longitudinal sectional view on substantially the line 3—3 of Figure 5.

Between the inner side bars 28 of the base frame construction, longitudinally extending floor strips 37 may be positioned, and, preferably, these are disposed below the top flanges of the bars to increase the car capacity. The vertical side flanges of the bars 28 permit the floor boards to be lowered at least to the top surfaces of the cross girts 14, 15 of the truck, and at their ends the boards may be connected by means of bolts or rivets 38 with the inwardly extending horizontal flanges 31' of the end cross bars 31. End filler blocks 39 (Figure 3) may be disposed between the horizontal flanges 31' and the top surfaces of the bottom boards 37, and as illustrated in Figure 3, one or more of the securing bolts 38 may pass through an inwardly extending lug 40 on the draw bar 41, the latter having a bolt 42 extending therethrough and into the bumper 43 which has a back flange 44 riveted or otherwise secured to the cross bar 31 of the base frame.

The side and end walls of the body unit may, if desired, be formed separately from the base frame, as a sub-unit, and positioned upon the base frame after the latter is secured to the truck unit. These walls, which constitute the base frame super-structure, may be formed of any suitable material, such as wood or metal, and as illustrated in the drawings (Figures 1 to 11) are of wooden planks. Each side wall is positioned in a vertical plane disposed inwardly from the upwardly extending vertical flange of the outer side bar 29 of the base frame structure, this vertical flange serving to reinforce the side walls at their lower ends.

At one end (Figure 5) the side walls 45 are joined to an end wall 46 by means of vertical corner angle irons 47, and at the opposite end, the side walls have connected thereto corresponding angle irons 48. These corner angle irons extend downwardly below the walls, and are connected to both the vertical flanges of the side bars 29 and the vertical flanges of the end cross-bars 31, as by means of bolts or rivets 49 (Figure 2). By thus extending the corner angle irons, they serve not only to unite the side and end walls, but also to secure together the wall structure and the base frame structure.

Intermediate the ends, the side walls are braced and reinforced by means of vertical channel irons 50 arranged between the wheel hoods and the outer flanges 35 of the latter are secured to the walls by means of bolts 52. The wheel hoods being formed of relatively rigid material constitute with the vertical channel bars 50, the only means necessary for securely bracing the side walls between the corner irons 47, 48.

The end of the car opposite the wall 46 may be closed by any suitable type of closure such as the swinging gate 54, pivotally supported by means of vertically extending straps 55 upon a hinge bar 56, the latter being mounted at its ends in extensions 48' of the corner irons 48. The gate may be retained closed by means of a vertically movable latch 57 having connected thereto an actuating lever 58 by means of links 60, 61, the latter working in a guide 62 upon the gate.

The latch engages the rear end of the draw bar 41 when the gate is closed. When the gate is opened by being moved outwardly after the latch is raised, its movement inwardly to closed position is not obstructed by the latch 57, since the latter is pivotally connected at 57' to the link 61, and when the latch engages the draw bar 41 upon endward movement of the gate, it will swing about its pivot until the gate is closed, and will then gravitate to the operative position illustrated in Figure 3.

It will be observed that the body construction is very simple and rugged, and comprises, broadly, two sub-units, namely, the base frame structure illustrated in Figure 7 and the super-structure including the side walls. These may be formed, separately, and the latter secured to the base frame after it is united with the truck unit. The base frame is securely mounted upon the truck due to the fact that the side elements of the base frame are mounted flush upon each of the sill bars 10, 11, 12 and 13 of the truck; the load is uniformly distributed and there is no tendency for the body to shift upon the truck. The downwardly extending flanges of the inner base frame bars 28 fit closely against the sides of the sill bars and assist the securing bolts in preventing any lateral shifting movement. Furthermore, it will be observed that by disposing upwardly the vertical flanges of the outer side bars 29, these assist in obtaining a firm and durable union of the base frame structure with the side walls.

Referring to Figures 13 to 18, there is shown a modified construction which may be utilized to provide a car of longer capacity. The truck illustrated is of the same construction as that shown in Figures 7 and 8.

The body unit comprises a base frame structure having inner longitudinal side bars 63 and outer longitudinal side bars 64. The side bars are angle irons and have their horizontal flanges disposed in substantially the same plane so that they may rest upon the truck sill bars. The vertical flanges of the inner side bars 63 are directed downwardly to be disposed at the inner sides of the inner truck sill bars and the vertical flanges of the outer side bars 64 are also directed downwardly, instead of upwardly, as in the base frame structure illustrated in Figure 7. This arrangement permits the body to be widened, and to provide a support for the lateral extensions. brackets 66 are positioned upon the outer side bars 64 intermediate their ends. Each of these brackets has a top horizontal web 67 resting upon the horizontal flange of an outer side bar 64 and a vertical shoulder 68 bearing against the vertical flange of the side bar. At their outer ends the bars by means of downwardly directed flanges carry vertical braces in the form of channel irons 69 which may be secured to the side walls of the car, the construction of which will be described later.

The base frame structure is completed by end cross bars 70 having inwardly disposed horizontal flanges 70' secured to the top horizontal flanges of the side bars 63, 64. The spaces between the side bars 63, 64, may be partially closed by means of wheel hoods 71 (Figure 14) which have horizontal edge flanges 72 secured to the bars 63, 64. Bottom plates 73 close the remainder of the spaces between the bars, and also extend outwardly to the vertical side braces 69. The bottom structure may be completed by any suitable form of flooring, such as a metal plate 75, disposed between the inner side bars 63 and substantially below the top flanges of the same. This lowering of the flooring affords a substantial increase in the car capacity, and materially lowers the center of gravity of the loaded car.

The walls of the car body comprise two side walls 76 joined to an end wall 77 by corner angle irons 78 interiorly disposed, and the three walls are united to the base frame structure by horizontal angle irons 79. The vertical flanges 79' are secured to the side walls and the horizontal flanges 79" secured to the end cross bars 70, the bottom plate 73 and side brackets 66. The tops of the walls may, if desired, be finished off by means of top angle strips 80. The opposite end of the car from the wall 77 may be closed by any suitable form of gate such as the gate 82 pivotally connected by means of straps 83 with the side walls.

Figure 1:
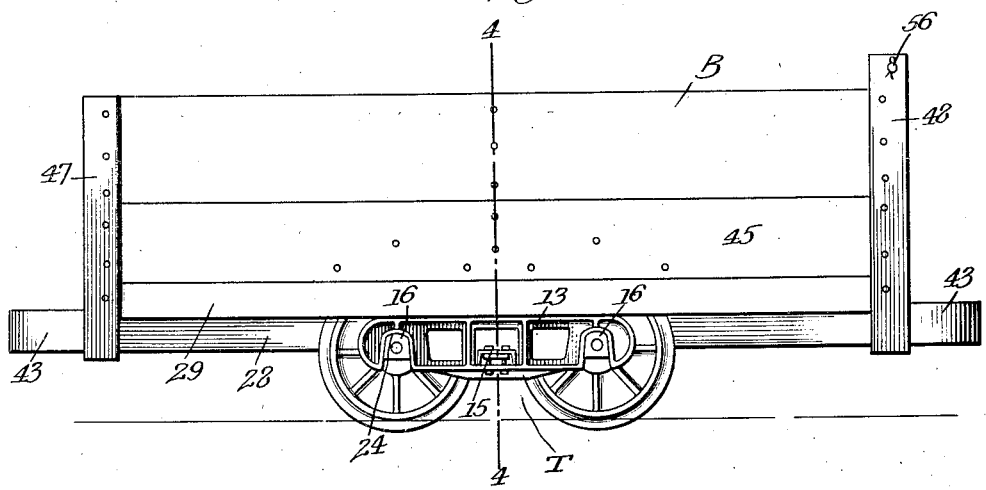
Figure 1 is a side elevational view.

It will be understood that this closure is shown only diagrammatically, since no invention is predicated upon the particular form illustrated, and gates of this type are old and well known in the art. Furthermore, it will be understood that the car shown in Figures 13 and 14 may be provided with bumpers such as shown in Figures 1 and 3, but these are not illustrated since the modification is shown merely for the purpose of setting forth the features of construction above described. As will be observed, the car is of the same general type as that previously described, the variations being simply in the construction of the base frame structure of the body and in the walls.

It will be understood that numerous variations may be made in the constructions described without departing from the invention which is defined by the following claims.

I claim:—

1. In a mine car, a body adapted to be mounted upon a truck, said body having a base frame structure comprising a pair of spaced side bars at each side, end cross bars connecting said pairs of side bars, said side bars being angular in cross section.

2. In a mine car, a body adapted to be mounted upon a truck, said body having a base frame structure comprising a pair of spaced side bars at each side, and cross bars connecting said pairs of side bars, said side bars being angular in cross section and at least one of each pair having a vertical flange extending downwardly from a horizontal flange.

3. In a mine car, a body adapted to be mounted upon a truck, said body having a base frame structure comprising a pair of spaced side bars at each side, and cross bars connecting said pairs of side bars, said side bars being angular in cross section and in substantially the same horizontal plane with at least one of each pair having a vertical flange extending downwardly from a horizontal flange.

4. In a mine car, a body adapted to be mounted upon a truck, said body having a base frame structure comprising a pair of spaced side bars at each side, end cross bars connecting said pairs of side bars, said side bars being angular in cross section, and the inner one of each pair having a vertical flange extending downwardly from a horizontal flange.

5. In a mine car, a body adapted to be mounted upon a truck, said body having a base frame structure comprising a pair of spaced side bars at each side, end cross bars connecting said pairs of side bars, said side bars being in substantially the same horizontal plane and being angular in cross section, and the inner one of each pair having a vertical flange extending downwardly from a horizontal flange.

6. In a mine car, a body having a base frame structure comprising a pair of spaced side bars at each side, end cross bars connecting said pairs of side bars, said side bars being angular in cross section and arranged in substantially the same horizontal plane, and wheel hoods positioned over the space between each pair of bars.

7. In a mine car and in combination, a truck unit having side sill bars and a body unit having a base structure comprising a plurality of side bars of angular cross section having horizontal flanges overlying the tops of said truck sill bars.

8. In a mine car and in combination, a truck unit having side sill bars and a body unit having a base structure comprising a plurality of side bars of angular cross section having horizontal flanges overlying said truck sill bars, there being at least two of said body unit side bars each having a vertical flange extending downwardly beside a truck sill bar from a horizontal flange overlying said sill bar.

9. In a mine car and in combination, a truck unit having side sill bars and a body unit having a base structure comprising a plurality of side bars of angular cross section having horizontal flanges overlying said truck sill bars, there being at least two of said body unit side bars each having a vertical flange extending downwardly at the inner side of a truck sill bar from a horizontal flange overlying said sill bar.

10. In a mine car and in combination, a truck unit having side sill bars and a body unit having a base structure comprising a plurality of side bars of angular cross section having horizontal flanges overlying said truck sill bars, there being at least two of said body unit side bars each having a vertical flange extending downwardly beside a truck sill bar from a horizontal flange overlying said sill bar and two additional side bars having vertical flanges extending from horizontal flanges overlying the truck sill bars.

11. In a mine car and in combination, a truck unit having side sill bars and a body unit having a base structure comprising a plurality of side bars of angular cross section having horizontal flanges overlying said truck sill bars, there being at least two of said body unit side bars each having a vertical flange extending downwardly beside a truck sill bar from a horizontal flange overlying said sill bar and two additional side bars having vertical flanges extending upwardly from the horizontal flanges overlying the truck sill bars.

12. In a mine car and in combination, a truck unit comprising sill bars arranged in pairs at opposite sides and a plurality of cross girts extending between said pairs, and a body unit comprising a base structure which includes a plurality of side bars extending longitudinally upon and overlying a plurality of said truck sill bars.

13. In a mine car and in combination, a truck unit comprising sill bars arranged in pairs at opposite sides and a plurality of cross girts extending between said pairs below the top surfaces thereof and a body unit comprising a base structure which includes a plurality of side bars extending longitudinally upon a plurality of said truck sill bars, said side bars being of angular cross section and having vertical flanges extending downwardly beside the truck sill bars from horizontal flanges overlying said sill bars.

14. In a mine car and in combination, a truck unit comprising sill bars arranged in pairs at opposite sides and a plurality of cross girts extending between said pairs below the top surfaces thereof and a body unit comprising a base structure which includes a plurality of side bars resting upon a plurality of said truck sill bars, said side bars being of angular cross section and having vertical flanges extending downwardly at the inner sides of the inner truck sill bars from horizontal flanges overlying said sill bars.

15. In a mine car and in combination, a truck unit comprising sill bars arranged in pairs at opposite sides and a plurality of cross girts extending between said pairs below the top surfaces thereof and a body unit comprising a base structure which includes a plurality of side bars arranged in pairs at opposite sides, said side bars each extending longitudinally upon a truck sill bar.

16. In a mine car and in combination, a truck unit comprising sill bars arranged in pairs at opposite sides and a plurality of cross girts extending between said pairs below the top surfaces thereof and a body unit comprising a base structure which includes a plurality of side bars arranged in pairs at opposite sides, said side bars each resting upon the top surface of a truck sill bar and being of angular cross section with the side bars above the inner two sill bars having vertical flanges extending downwardly beside said sill bars from horizontal flanges overlying the sill bars.

17. In a mine car and in combination, a truck unit comprising sill bars arranged in pairs at opposite sides and a plurality of cross girts extending between said pairs below the top surfaces thereof and a body unit comprising a base structure which includes a plurality of side bars arranged in pairs at opposite sides, said side bars each resting upon a truck sill bar and being of angular cross section with the side bars above the inner two sill bars having vertical flanges extending downwardly at the inner side of said sill bars from horizontal flanges overlying the sill bars.

18. In a mine car and in combination, a truck unit comprising sill bars arranged in pairs at opposite sides and a plurality of cross girts extending between said pairs below the top surfaces thereof and a body unit comprising a base structure which includes a plurality of side bars arranged in pairs at opposite sides, said side bars each resting upon the top surface of a truck sill bar and being of angular cross section with the side bars above the inner two sill bars having vertical flanges extending downwardly beside said sill bars from horizontal flanges overlying the top surfaces of the latter and the outer two side bars having vertical flanges extending upwardly from horizontal flanges.

19. In a mine car and in combination, a truck unit comprising sill bars arranged in pairs at opposite sides and a plurality of cross girts extending between said pairs below the top surfaces thereof and a body unit comprising a base structure which includes a plurality of side bars arranged in pairs at opposite sides, and cross bars connecting said pairs of side bars, said side bars each extending longitudinally upon the top surface of a truck sill bar.

20. In a mine car, a body unit comprising a base frame structure having opposite side elements formed with upwardly and downwardly directed flanges at their outer and inner sides respectively.

21. In a mine car, a body unit comprising a base frame structure having opposite side elements formed with upwardly and downwardly directed flanges at their outer and inner sides respectively, each element being formed with a space therein to receive car wheels.

22. In a mine car and in combination, a truck unit comprising side sill bars and a body unit comprising a base frame structure having opposite side elements formed with upwardly and downwardly directed flanges at their outer and inner sides respectively, said side elements resting upon said truck sill bars between said flanges.

23. In a mine car and in combination, a truck unit comprising side sill bars and a body unit comprising a base frame structure having opposite side elements formed with upwardly and downwardly directed flanges at their outer and inner sides respectively, each element being formed with a space therein to receive car wheels, said side elements resting upon said truck sill bars between said flanges.

24. In a mine car and in combination, a truck unit comprising two pairs of side sill bars disposed, respectively, at opposite sides, the members of each pair having wheels positioned therebetween and a body unit comprising a base structure having opposite side elements each formed at its inner side with a downwardly directed flange, said elements resting upon the truck sill bars and cross members connecting said elements.

25. In a mine car and in combination, a truck unit comprising two pairs of side sill bars disposed, respectively, at opposite sides, the members of each pair having wheels positioned therebetween and a body unit comprising a base structure having opposite side elements each formed at its inner side with a downwardly directed flange and at its outer side with a vertically disposed flange, said elements resting upon the truck sill bars and cross members connecting said elements.

26. In a mine car and in combination, a truck unit comprising two pairs of side sill bars disposed, respectively, at opposite sides, the members of each pair having wheels positioned therebetween and a body unit comprising a base structure having opposite side elements each formed at its inner side with a downwardly directed flange and at its outer side with a vertically disposed flange, said elements resting upon the truck sill bars and having openings therein through which the wheels project, and wheel hoods over said wheels.

In testimony whereof I have hereunto set my hand.

GLENN E. EDMUNDS.